(12) United States Patent
Horst (10) Patent No.: US 6,424,655 B1
(45) Date of Patent: Jul. 23, 2002

(54) TRANSPOSE TABLE-BIASED ARBITRATION

(75) Inventor: Robert W. Horst, Saratoga, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/078,401

(22) Filed: May 13, 1998

(51) Int. Cl.$^7$ .............................................. H04L 12/28
(52) U.S. Cl. ...................................... 370/412; 370/461
(58) Field of Search ................................ 370/412, 461, 370/462, 463, 444; 709/238

(56) References Cited

U.S. PATENT DOCUMENTS

| | | | |
|---|---|---|---|
| 5,694,121 A | 12/1997 | Krause et al. ........... 340/825.5 |
| 5,710,549 A | * 1/1998 | Horst et al. .................. 370/462 |
| 5,956,340 A | * 9/1999 | Afek et al. .................. 370/412 |
| 6,081,527 A | * 6/2000 | Chappel et al. ............. 370/462 |

* cited by examiner

*Primary Examiner*—Brian Zimmerman
(74) *Attorney, Agent, or Firm*—Leah Sherry; Oppenheimer, Wolff & Donnelly (57) ABSTRACT

A biased arbitration technique utilizes a transpose table to arbitrate access to a shared resource. Each column of transpose table is a binary bias vector encoding a bias value assigned to one of the requesters. The rows of the table are fetched to assure that requesters having high bias values are granted more frequent access to the shared resource.

15 Claims, 9 Drawing Sheets

|  |  | PORT |  |  |  |  |  |  |  |  |  |  |  |
|---|---|---|---|---|---|---|---|---|---|---|---|---|---|
| ROW# |  | 0 | 1 | 2 | 3 | 4 | 5 | 6 | 7 | 8 | 9 | 10 | 11 |
| 0 | $2^8$ | 0 | 0 | 0 | 0 | 0 | 0 | 0 | 0 | 0 | 0 | 0 | 0 |
| 1 | $2^7$ | 0 | 0 | 0 | 0 | 0 | 0 | 0 | 0 | 0 | 0 | 0 | 0 |
| 2 | $2^6$ | 0 | 0 | 0 | 0 | 0 | 0 | 0 | 0 | 0 | 0 | 0 | 0 |
| 3 | $2^5$ | 0 | 0 | 0 | 0 | 0 | 0 | 0 | 0 | 0 | 0 | 0 | 0 |
| 4 | $2^4$ | 0 | 0 | 0 | 0 | 0 | 0 | 0 | 0 | 0 | 0 | 0 | 0 |
| 5 | $2^3$ | 0 | 1 | 1 | 0 | 0 | 0 | 0 | 0 | 0 | 0 | 0 | 0 |
| 6 | $2^2$ | 0 | 0 | 0 | 0 | 0 | 0 | 0 | 0 | 0 | 0 | 0 | 0 |
| 7 | $2^1$ | 0 | 1 | 1 | 0 | 1 | 0 | 0 | 0 | 0 | 0 | 0 | 0 |
| 8 | $2^0$ | 1 | 0 | 0 | 1 | 1 | 1 | 1 | 1 | 1 | 1 | 1 | 1 |

FIG. 5.

| CTR |  |  |  |  |  |  |  |  | ROW | ACCESSED |
|---|---|---|---|---|---|---|---|---|---|---|
| 8 | 7 | 6 | 5 | 4 | 3 | 2 | 1 | 0 |  |  |
| x | x | x | x | x | x | x | x | 0 | 0 | $2^8$ |
| x | x | x | x | x | x | x | 0 | 1 | 1 | $2^7$ |
| x | x | x | x | x | x | 0 | 1 | 1 | 2 | $2^6$ |
| x | x | x | x | x | 0 | 1 | 1 | 1 | 3 | $2^5$ |
| x | x | x | x | 0 | 1 | 1 | 1 | 1 | 4 | $2^4$ |
| x | x | x | 0 | 1 | 1 | 1 | 1 | 1 | 5 | $2^3$ |
| x | x | 0 | 1 | 1 | 1 | 1 | 1 | 1 | 6 | $2^2$ |
| x | 0 | 1 | 1 | 1 | 1 | 1 | 1 | 1 | 7 | $2^1$ |
| 0 | 1 | 1 | 1 | 1 | 1 | 1 | 1 | 1 | 8 | $2^0$ |
| 1 | 1 | 1 | 1 | 1 | 1 | 1 | 1 | 1 | (None) |  |

FIG. 6.

REQMATRIX:

|  | ROW | PORT 0 | 1 | 2 | 3 | 4 | 5 | 6 | 7 | 8 | 9 | 10 | 11 | LSREQS |
|---|---|---|---|---|---|---|---|---|---|---|---|---|---|---|
| MSB | 0 | 0 | 0 | 0 | 0 | 0 | 0 | 0 | 0 | 0 | 0 | 0 | 0 | 0 |
|  | 1 | 0 | 0 | 0 | 0 | 0 | 0 | 0 | 0 | 0 | 0 | 0 | 0 | 0 |
|  | 2 | 0 | 0 | 0 | 0 | 0 | 0 | 0 | 0 | 0 | 0 | 0 | 0 | 0 |
|  | 3 | 0 | 0 | 0 | 0 | 0 | 0 | 0 | 0 | 0 | 0 | 0 | 0 | 0 |
|  | 4 | 0 | 0 | 0 | 0 | 1 | 1 | 0 | 0 | 0 | 0 | 0 | 0 | 1 |
|  | 5 | 0 | 1 | 0 | 0 | 0 | 0 | 0 | 0 | 0 | 0 | 0 | 0 | 1 |
|  | 6 | 1 | 0 | 0 | 0 | 0 | 1 | 0 | 0 | 0 | 0 | 0 | 0 | 1 |
|  | 7 | 0 | 0 | 0 | 0 | 0 | 0 | 0 | 0 | 0 | 0 | 0 | 0 | 1 |
| LSB | 8 | 1 | 0 | 1 | 0 | 0 | 0 | 0 | 0 | 0 | 0 | 0 | 1 | 1 |
| REQ VECTOR |  | 1 | 1 | 1 | 0 | 1 | 1 | 0 | 0 | 0 | 0 | 1 | 1 |  |
| REQUESTED WINS |  | 5 | 8 | 1 | 0 | 16 | 20 | 0 | 0 | 0 | 0 | 0 | 1 |  |

*FIG. 7.*

| CTR | # WINNER | WINNERS | $R_R=$ | 0 | 1 | 2 | 3 | 4 | ACCUMULATED WINS 5 | 6 | 7 | 8 | 9 | 10 | 11 |
|---|---|---|---|---|---|---|---|---|---|---|---|---|---|---|---|
| 15 | 2 | 000011000000 | 4 | 0 | 0 | 0 | 0 | 1 | 1 | 0 | 0 | 0 | 0 | 0 | 0 |
| 31 | 1 | 010000000000 | 5 | 0 | 1 | 0 | 0 | 1 | 1 | 0 | 0 | 0 | 0 | 0 | 0 |
| 47 | 2 | 000011000000 | 4 | 0 | 1 | 0 | 0 | 2 | 2 | 0 | 0 | 0 | 0 | 0 | 0 |
| 63 | 2 | 100001000000 | 6 | 1 | 1 | 0 | 0 | 2 | 3 | 0 | 0 | 0 | 0 | 0 | 0 |
| 79 | 2 | 000011000000 | 4 | 1 | 1 | 0 | 0 | 3 | 4 | 0 | 0 | 0 | 0 | 0 | 0 |
| 95 | 1 | 010000000000 | 5 | 1 | 2 | 0 | 0 | 3 | 4 | 0 | 0 | 0 | 0 | 0 | 0 |
| 111 | 2 | 000011000000 | 4 | 1 | 2 | 0 | 0 | 4 | 5 | 0 | 0 | 0 | 0 | 0 | 0 |
| 127 | 0 | 000000000000 | 7 | 1 | 2 | 0 | 0 | 4 | 5 | 0 | 0 | 0 | 0 | 0 | 0 |
| 143 | 2 | 000011000000 | 4 | 1 | 2 | 0 | 0 | 5 | 6 | 0 | 0 | 0 | 0 | 0 | 0 |
| 159 | 1 | 010000000000 | 5 | 1 | 3 | 0 | 0 | 5 | 6 | 0 | 0 | 0 | 0 | 0 | 0 |
| 175 | 2 | 000011000000 | 4 | 1 | 3 | 0 | 0 | 6 | 7 | 0 | 0 | 0 | 0 | 0 | 0 |
| 191 | 2 | 100001000000 | 6 | 2 | 3 | 0 | 0 | 6 | 6 | 0 | 0 | 0 | 0 | 0 | 0 |
| 207 | 2 | 000011000000 | 5 | 2 | 3 | 0 | 0 | 7 | 9 | 0 | 0 | 0 | 0 | 0 | 0 |
| 223 | 1 | 010000000000 | 5 | 2 | 4 | 0 | 0 | 7 | 9 | 0 | 0 | 0 | 0 | 0 | 0 |
| 239 | 2 | 000011000000 | 5 | 2 | 4 | 0 | 0 | 8 | 10 | 0 | 0 | 0 | 0 | 0 | 0 |
| 255 | 3 | 101000000001 | 4 | 3 | 4 | 1 | 0 | 8 | 10 | 0 | 0 | 0 | 0 | 0 | 1 |
| 271 | 2 | 000011000000 | 5 | 3 | 4 | 1 | 0 | 9 | 11 | 0 | 0 | 0 | 0 | 0 | 1 |
| 287 | 1 | 010000000000 | 4 | 3 | 4 | 1 | 0 | 9 | 11 | 0 | 0 | 0 | 0 | 0 | 1 |
| 303 | 2 | 000011000000 | 4 | 3 | 5 | 1 | 0 | 10 | 12 | 0 | 0 | 0 | 0 | 0 | 1 |
| 319 | 2 | 100001000000 | 6 | 4 | 5 | 1 | 0 | 10 | 13 | 0 | 0 | 0 | 0 | 0 | 1 |
| 335 | 2 | 000011000000 | 4 | 4 | 5 | 1 | 0 | 11 | 14 | 0 | 0 | 0 | 0 | 0 | 1 |
| 351 | 1 | 010000000000 | 5 | 4 | 6 | 1 | 0 | 11 | 14 | 0 | 0 | 0 | 0 | 0 | 1 |
| 367 | 2 | 000011000000 | 4 | 4 | 6 | 1 | 0 | 12 | 15 | 0 | 0 | 0 | 0 | 0 | 1 |
| 383 | 0 | 000000000000 | 7 | 4 | 6 | 1 | 0 | 12 | 15 | 0 | 0 | 0 | 0 | 0 | 1 |
| 399 | 2 | 000011000000 | 4 | 4 | 6 | 1 | 0 | 13 | 16 | 0 | 0 | 0 | 0 | 0 | 1 |
| 415 | 1 | 010000000000 | 5 | 4 | 7 | 1 | 0 | 13 | 16 | 0 | 0 | 0 | 0 | 0 | 1 |
| 431 | 2 | 000011000000 | 4 | 4 | 7 | 1 | 0 | 14 | 17 | 0 | 0 | 0 | 0 | 0 | 1 |
| 447 | 2 | 100001000000 | 6 | 5 | 7 | 1 | 0 | 14 | 18 | 0 | 0 | 0 | 0 | 0 | 1 |
| 463 | 2 | 000011000000 | 4 | 5 | 7 | 1 | 0 | 15 | 19 | 0 | 0 | 0 | 0 | 0 | 1 |
| 479 | 1 | 010000000000 | 5 | 5 | 8 | 1 | 0 | 15 | 19 | 0 | 0 | 0 | 0 | 0 | 1 |
| 495 | 2 | 000011000000 | 4 | 5 | 8 | 1 | 0 | 16 | 20 | 0 | 0 | 0 | 0 | 0 | 1 |
| 511 | 0 | 000000000000 | - | 5 | 8 | 1 | 0 | 16 | 20 | 0 | 0 | 0 | 0 | 0 | 1 |

ReqMatrix = TransposeTable masked by Req Vector
(force idle ports have to have all-zero columns)

ReqBits = [OR(MSrow of ReqMatrix),...
           OR(LSrow of ReqMatrix)]

LSReqs = Extend(ReqBits)=[0,...0, 1st req, 1...1]
         - Set all bits after first 1

CtrMask<8:0> = $\overline{LSReqs<0:8>}$ - reverse and complement
         Ctr = Ctr OR CtrMask Winners = ReqMatrix(RightMost0(Ctr))--get row of table          yes
    Winners = 0? ———►Ctr = Ctr + 1
       | no i = LeftMostOne(Winners)
Port i wins arbitration
Winners<i>=0

$$\text{TransposeTable} = \begin{bmatrix} \text{Port 0 Bias} \\ \text{Port 1 Bias} \\ \vdots \\ \text{Port P Bias} \end{bmatrix} \begin{matrix} \text{MSB} \\ \\ \\ \text{LSB} \end{matrix}$$

ReqMatrix = Transpose talbe outputs output ANDed with
            appropriate Reqbits Ctr = 9-bit binary req. Output are ORed with ReqMask,
      then +1 circuit feeds back ReqMask = Shortens length of counter to count past zero
          rows of ReqMatrix

TRANSPOSE TABLE-BIASED ARBITRATION

BACKGROUND OF THE INVENTION

The present invention relates generally to techniques for arbitrating access to a shared resource. One particular example is a device having multiple inputs and outputs for routing message traffic in a communications network. More particularly, the invention relates to a method, and apparatus for implementing that method, to bias the arbitration between two or more inputs of the device that are contending for data communication access to the same output of the device.

As multiprocessing environments grow, the ability to provide data communication between the individual system elements (i.e., processors and peripheral equipment) of the system requires careful thought so as not to inadvertently give a system element unfair access to a communications path or some other shared resource (e.g., a multiple-user bus system) while, at the same time, limiting such access to other system elements.

Many of today's data communication networking configurations will use various devices (typically, "routers") to direct or otherwise route message traffic from one communications link to one of a number of other communications links. However, message traffic can be received at two or more inputs of the device at substantially the same time bound for the same output, raising the issue of which of the two will be allowed to proceed before the other, i.e., who goes first. Access to the output requires some form of arbitration between the two contending inputs. Smaller systems (i.e., those with a small number of system elements needing to communicate with one another) may use such classic arbitration techniques as assigning fixed priorities to the inputs or "round-robin" processing. In the former, each port input is provided a predetermined priority to form a hierarchical arbitration scheme. Inputs with higher priority will be given access to an output over inputs with lower pre-assigned priorities seeking access to that same output. The round-robin technique involves assigning priorities according to a predetermined order among the inputs. As message traffic is received, the priorities change so that the last input granted access to a particular output is then given the lowest priority, and the next input in order now has the highest priority; the remaining inputs will have their priorities similarly changed according to the predetermined order.

Similar techniques may be used in other shared resource environments such as, for example, multiple-user bus systems, to allocate access to the bus between connected controllers.

As computing systems become more complex, so that the number of elements (processors and peripheral units) increase, it would not be unusual for an input of a routing device to be required to route message traffic from several elements. Further, routing devices are sometimes cascaded to form, for example, tree-like network configurations, increasing the number of system elements that may need to route message traffic through an input of a routing device. Using pre-assigned priorities, round-robin processing, or other similar techniques can unfairly allocate the services of a routing device's input to some of the system's elements at the expense of other elements that use another input of that routing device. For example, a routing device may receive at one input message traffic from only one system element, while another input of that same routing device is required to service several elements. Using any of the above techniques will operate to give more of the routing device's attention to the one element, and less attention to each of the several elements using the second input. Thus, prior arbitration techniques can unfairly allocate more of the routing device's services to the input having the lesser number of system elements using that routing device.

One solution to assuring fair allocation of services to device inputs is to use biased arbitration techniques. With biased arbitration, each input has a bias value that determines the percentage of time it will win arbitration.

Biased arbitration can be used either to assure fair access to all nodes, or to purposely give some paths higher priority than other paths. Biased arbitration can be used to help support quality of services (QOS) guarantees for real-time or constant bit rate traffic.

One biased arbitration system is described in U.S. Pat. No. 5,694,121, assigned to the assignee of the present application, which discloses an ALU arbitration technique. Each port has a bias value provided and has an associated accumulator. The port with the highest value in its accumulator wins arbitration. The winner then decrements its accumulator by sum of the bias values of all the losers, and each loser increments its accumulator by its own bias value. Another biased arbitration system is described in U.S. Pat. No. 5,710,549, which is also assigned to the assignee of the present application.

This ALU biasing scheme works well for routers with small numbers of ports. However, it does not scale well to larger routers because large adders and logic for pairwise comparisons of all accumulators are required to determine a current arbitration winner.

Accordingly, research continues to develop effective biased arbitration techniques of utility on complex systems.

SUMMARY OF THE INVENTION

According to one aspect of the present invention, requestors are assigned bias values which are encoded as binary bias vectors. The bias vectors are stored as columns in a matrix, with each column corresponding to a particular requester. During an arbitration the rows of the matrix are fetched; thus, the matrix is designated a transpose matrix. The rows are fetched in a way that gives the correct biasing and also gives the lowest possible latency.

According to another aspect of the invention, storage areas hold requester identifiers identifying unique requesters in a plurality of requesters. Storage areas are accessed at different frequencies. Requestors assigned a high bias priority have their requestor identifiers stored in one or more storage areas that are accessed at a higher frequency and requesters having a low bias priority have their requestor identifiers stored in one or more storage locations accessed at a lower frequency.

According to another aspect of the invention, the rows are fetched by a mapped counter output. The counter output is mapped so that rows having more significant bit positions of the binary bias vectors are fetched more frequently that less significant bit positions.

According to another aspect of the invention, bias vectors for requestors not having a request pending are masked during an arbitration.

According to another aspect of the invention, most significant rows having no active request are masked to avoid fetching the rows.

According to another aspect of the invention, a compression technique is utilized to reduce storage in the case where a transpose matrix stores a large number of "0"s.

Other features and advantages will be apparent in view of the following detailed description and appended drawings.

BRIEF DESCRIPTION OF THE DRAWINGS

FIG. 8 is a table depicting the results of an arbitration utilizing the request matrix of FIG. 7;

DETAILED DESCRIPTION OF THE PREFERRED EMBODIMENTS

The present invention has utility in any system where a number of requestors periodically request access to a shared resource.

The preferred embodiments will first be described in the context of a system area network utilizing routers having a plurality of ports. As will be described in more detail below the biased arbitration technique is scalable to systems having large numbers of requesters requesting access to single shared resource.

Figure 1:
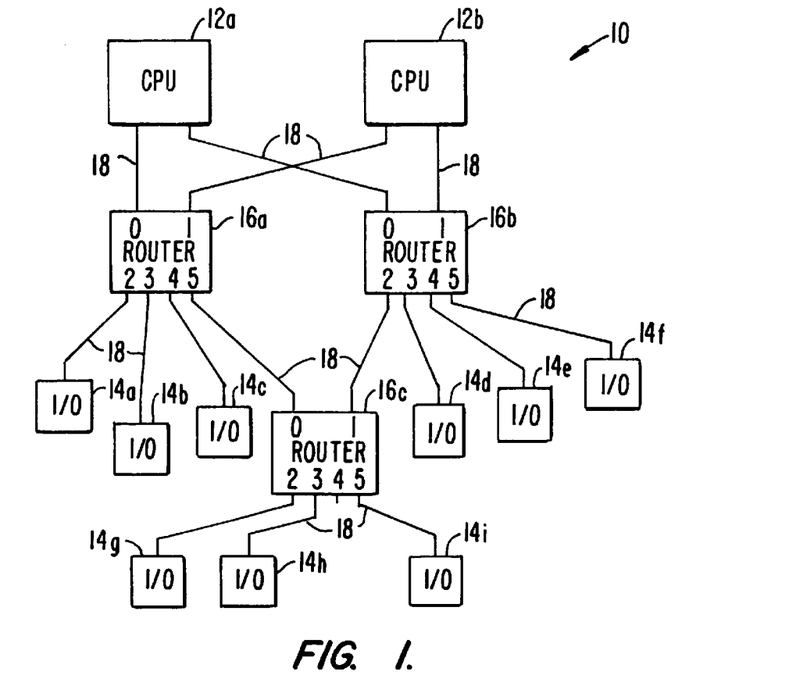
FIG. 1 is a simplified block diagram of a multiple processor system comprising a pair of central processing units (CPUs) coupled to one another and a plurality of input/output (I/O) units by a system area network ("SAN") for communicating message traffic therebetween using router units incorporating the present invention.

Turning now to the figures, and for the moment initially FIG. 1, there is illustrated a simplified multiple processing system, designated generally with the reference numeral 10. As shown, the multiple processing system 10 comprises at least a pair of central processing units (CPUS) 12a, 12b, and a plurality of input/output units 14 (14a, 14b, . . . 14i) interconnected in a system area network configuration by routing units, or routers, 16, and bidirectional communication links 18. Preferably, message traffic between the various elements of the system 10 is in the form of data packets comprising serially transmitted 9-bit symbols, together with the necessary transmitting clocks for synchronous transfers of the symbols. The symbols are encoded to form either data or commands used for network protocol flow control. Network flow control is not relevant to the understanding or implementation of the present invention and, therefore, is not discussed further herein, except as necessary to the description of certain of the elements of the router units 16.

Each message, however, contains data identifying the source and destination of the message. The destination is used by the routers 16 to select the port output from which the message will be re-transmitted.

Continuing with FIG. 1, each of the routers 16 has six bi-directional ports (0, 1, . . . , 5), each having an port input at which message traffic may be received, and an port output from which message traffic can be sent. Each of the ports 2, 3, 4 (and 0 and 1) of the router 16a services (i.e., routes traffic from) only one system element. Port 5, on the other hand, has as many as eight system elements capable of sending message traffic for routing through that port: both CPUs 12 (via routers 16b and 16c) and six I/O units 14 (via routers 16b and 16c). It is possible that all 8 possible sources could transmit message traffic to be routed via the port input of port 5 of router 16a for transmission through an port output of the router 16a, for example port output (0) of port 0.

In contrast, ports 1–4 of the router 16a have only a single element that may need to contend for access to the port output of port 0. An arbitration method in which equal access to an port output is granted each port input would provide each of the I/O units 14a, 14b, and 14c respectively connected to the ports 2, 3, and 4 with more frequent access to the port 0 than that provided the I/O units 14g, 14h, and 14i that send message traffic to port 5 of the router 16a. The present invention works to alleviate that problem by biasing port 5 of router 16a to give it more frequent access to port 0 (or any other port) than ports 2–4.

Figure 2:
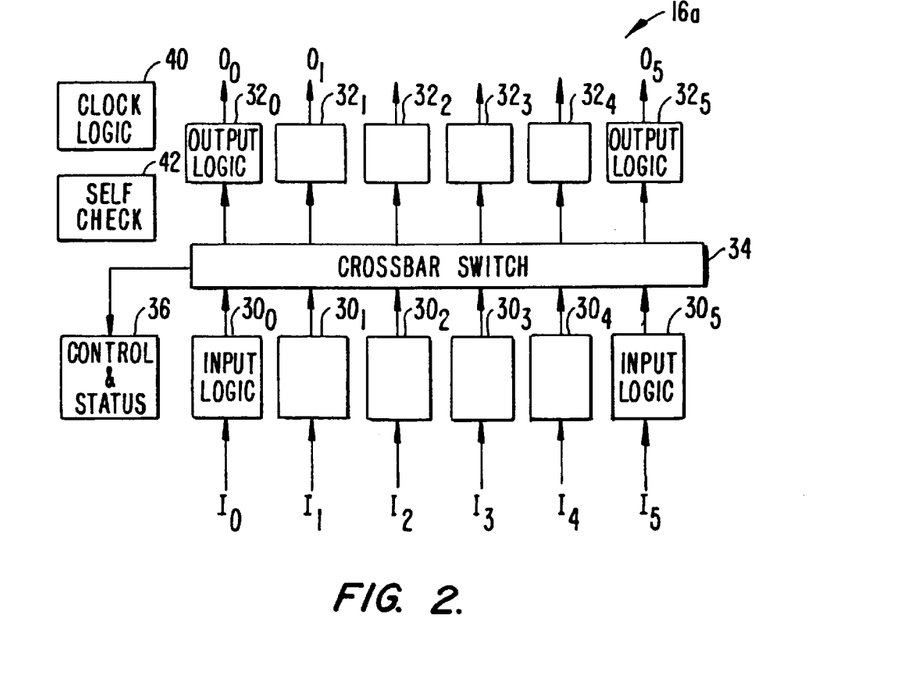
FIG. 2 is a simplified block diagram of a router unit used in the system area network of FIG. 1, illustrating its construction, including its multiple, separate input and port outputs whereat message traffic is received and re-transmitted.

Turning now to FIG. 2, a simplified block diagram of the router 16a is illustrated. It will be appreciated that the routers 16b and 16c are structured substantially the same as the router 16a, unless otherwise noted, so that the following description of the router 16a will apply equally to the routers 16b, 16c.

As indicated above, each of the ports 0, 1, . . . , 5 can receive and/or transmit message traffic. FIG. 2 shows, therefore, the router 16a as having, for each port 0, 1, . . . , 5, an port input (I) for receiving message traffic, and an port output (O) from which for message traffic is transmitted. Each port input has an associated input logic 30 ($30_0$, $30_1$, . . . , $30_5$) for handling receipt of message traffic, and output logic 32 ($32_0$, $32_1$, . . . , $32_5$) from which message traffic is transmitted. Incoming message traffic is routed from the input logic 30 of the receiving port to one of the port outputs by a crossbar switch 34, controlled in part by control and status logic 36 (as well as the individual output logic elements 32, as will be discussed further below). Thus, for example, message traffic received by the port input I(0) of port 0 is applied to the associated input logic $30_0$ and routed to a designated output logic (e.g., output logic $30_3$) by the crossbar switch 34. The port output O(3) of port 3 has output logic $32_3$ for transmitting data coupled thereto.

A control and status logic element contains the various state machines that effect synchronous control over most of the operation of the router. Additionally, the router 16a includes clock logic 40 for supplying various clocking signals necessary to synchronously operate the elements of the router, and self-check circuitry 42 that performs certain self-check operations not relevant to the invention herein with one exception.

Figure 3:
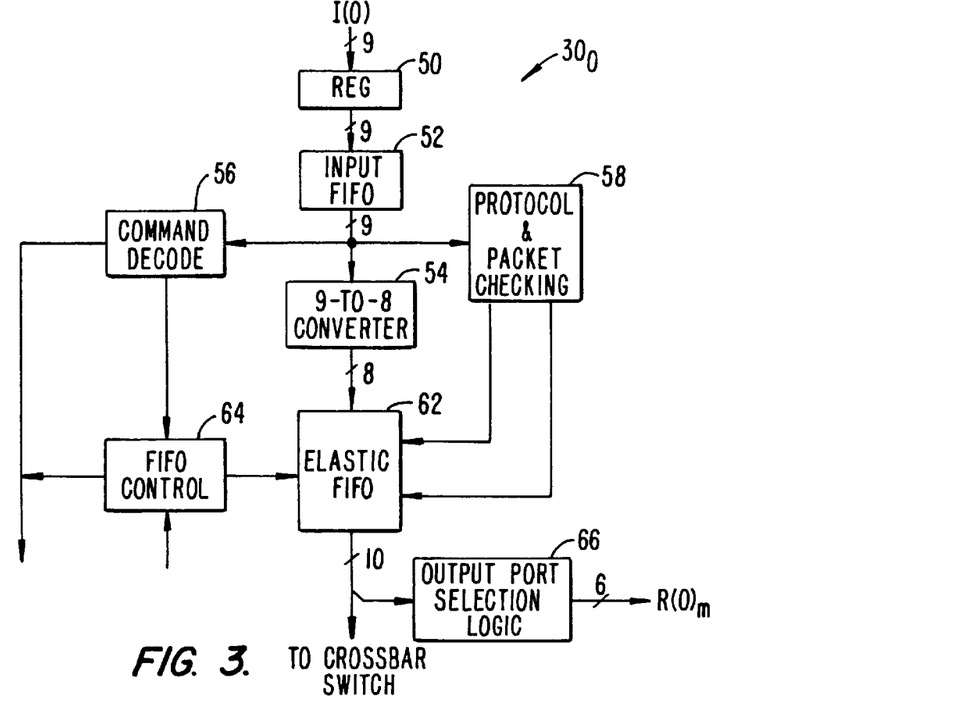
FIG. 3 is a simplified block diagram of the input logic associated with a port input of the router unit shown in FIG. 2.
Figure 4:
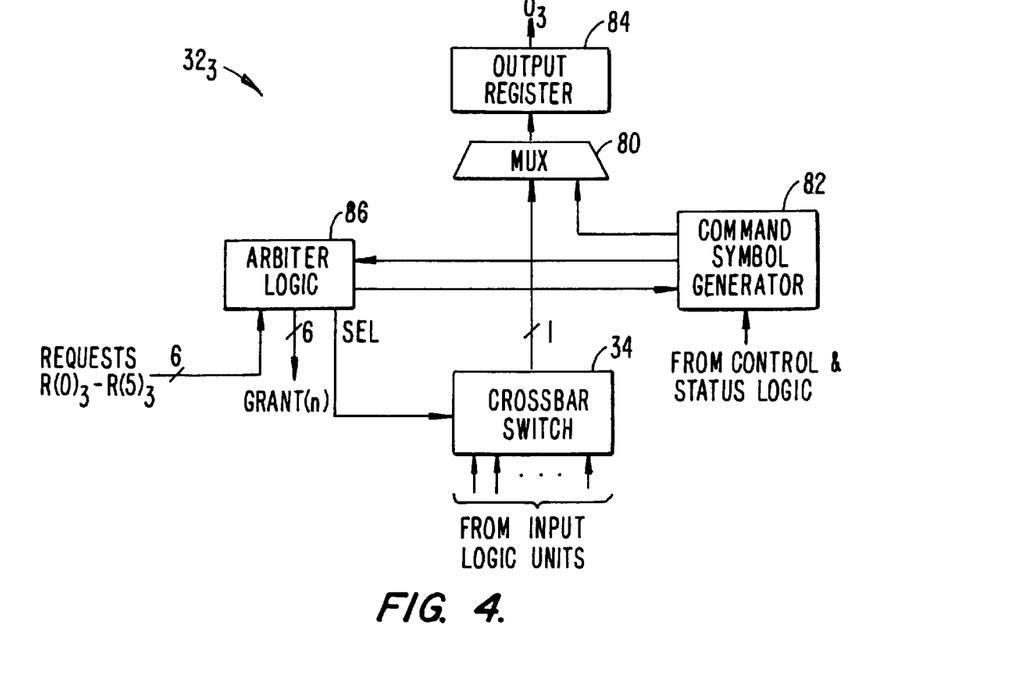
FIG. 4 is a simplified block diagram of the output logic associated with a port output of the router unit of FIGS. 1 and 2.

Referring now to FIG. 3, a block diagram of the input logic $30_0$ is illustrated of the port input I(0). The input logic $3_0$, . . . $30_5$ for the other port input I (1), . . . , I(5) are of substantially identical construction, and unless noted otherwise the description of the input logic $30_0$ should be taken as a description of the input logic $30_1$, . . . $30_5$.

FIG. 3 shows the input logic $30_0$ as including an input register 50 that operates to receive and buffer the incoming message traffic for transfer to an input first-in-first-out buffer queue (FIFO) 52. The FIFO 52 operates to provide synchronization between the clock signal (not shown) the originates at the transmitting entity, and is used to clock data into the register 50 and FIFO 52, and the (local) clock use to pull symbols from the FIFO 52.

Information from the input FIFO 52 is coupled to a 10-to-8 (bit) converter 54 that converts each 10-bit symbol from its encoded form to byte form. In addition, the output of the input FIFO 52 is coupled to a command decode element 56, and a protocol and packet checking unit 58. The command decode unit 56 examines each symbol to determine if it is a flow control command, and therefore a command that the router must act upon, or data, which need not be acted upon by the router (other than routing it to the proper port output). The protocol and packet checking unit 58 operates to ensure that the packet meets the necessary protocol of transfer, and checks the concluding check sum of the packet to ensure that the packet was transmitted to the router 16a properly. If not, the protocol and packet checking unit 58 will tack onto the end of the packet a symbol that identifies the packet as possibly being erroneous.

Incoming message traffic, passed through the 10-to-8 bit converter 54, is received and temporarily stored in an elastic FIFO 62, controlled by a FIFO control 64. The FIFO 62 provides sufficient temporary storage to allow the Destination ID of the incoming message packet to be examined, and to allow time for the port outputs to operate the crossbar switch 34 to route the message traffic. The FIFO 62 must also provide sufficient storage to allow sufficient time to halt the incoming message traffic transmission in the event the receiving port input must wait.

Selection of the proper port output, however, depends upon the destination address contained in the incoming message packet. That determination is made by the port output selection logic 66 which receives the destination address contained in the incoming message packet. From the destination address the port output selection logic 66 identifies the designated port output, asserting a request signal on one of six request lines, $R(O)_m$, where m=0, 1, ... , 5, identifying the requested port output.

In the above description, provided primarily for background purposes a router having six ports is described. In the following description of a preferred embodiment a router having twelve ports is employed. The particular configuration of the router, including the number of ports, is not critical to or a part of the present invention.

Before continuing, a word about notation: in the following a biased arbitration scheme is described for a router having 12 ports; thus, the port output selection logic 66 produces twelve output signals, each of which is carried on one of twelve request lines $R(0)_0$, $R(0)_1$, ... , $R(0)_{11}$. The form of the request signal lines is $R(n)_m$, where n(n=0, 1, ... , 11) identifies the driving source of the signal line, and m (m=1, 2, ... , 11) identifies the destination of the signal carried. Accordingly, the port output selection logic 66 drives the twelve request lines $R(0)_0$, $R(0)_1$, ... , $R(0)_{11}$ each of which couple the signal they may carry to output logic $32_0$, $32_1$, ... , $32_{11}$, respectively. In similar fashion, the output logic 32 of each port output will grant access, in response to received request signals, by asserting a GRANT signal on one of twelve signal lines $GRANT(n)_m$. Again, the n will identify the output logic driving the signal line, and the m will identify the input logic 30 receiving that driving signal. Unless noted otherwise, this notation is used throughout this discussion.

An embodiment of the bias logic of the present invention will now be described. First, a conceptual explanation of the embodiment will be described with reference to FIGS. 5–8, then a hardware realization of the embodiment will be described with reference to FIGS. 9–10. The operation of the invention will be described in the context of the system area network described above with reference to FIGS. 1–4.

Figure 5:
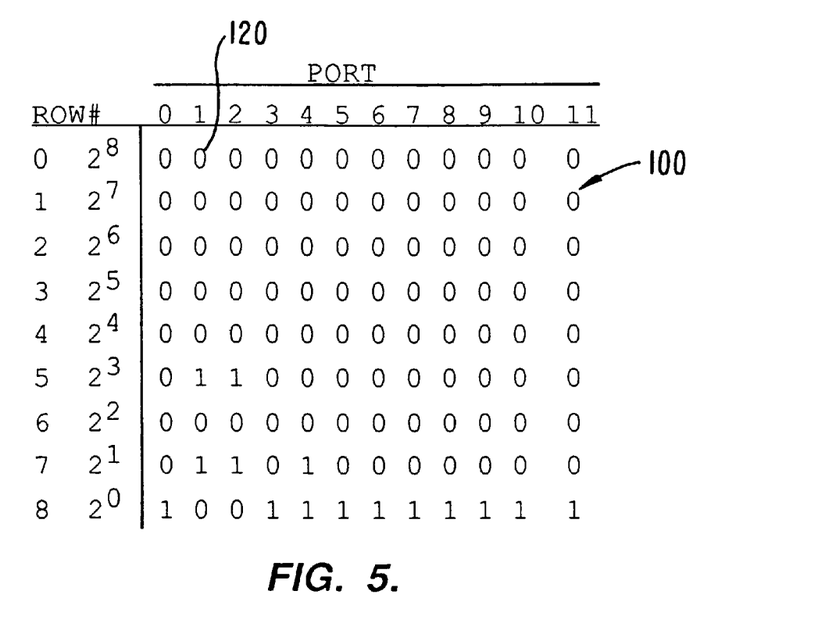
FIG. 5 is a table depicting a transpose table.

Turning now to FIG. 5, a transposed table of bias values 100 is depicted. Each column 120 of the transposed table 100 is a binary bias vector encoding the bias value of the port input listed above the column 120. The rows are numbered starting from the most significant bit of each vector 120. Beside each row is a power of 2 indicating the value of the place holder in each column.

The table is accessed row by row during an arbitration to grant access to ports having requests pending. The frequency with which each port gains access is determined the frequency with which rows including a "1" in the port's binary bias vector are accessed. The frequency with which each row is accessed is determined by a unique counter mapping technique described below.

During arbitration the rows are selected using the mapped output of a counter. The mapping function is depicted as a table 200 in FIG. 6 with the bit positions of the counter output (0 to 8) listed at the top of the table 200 and the row accessed listed to the right of the table 200. Note that the effect of the mapping function is to select the row corresponding to the position of the rightmost 0 in the counter output.

Figure 6:
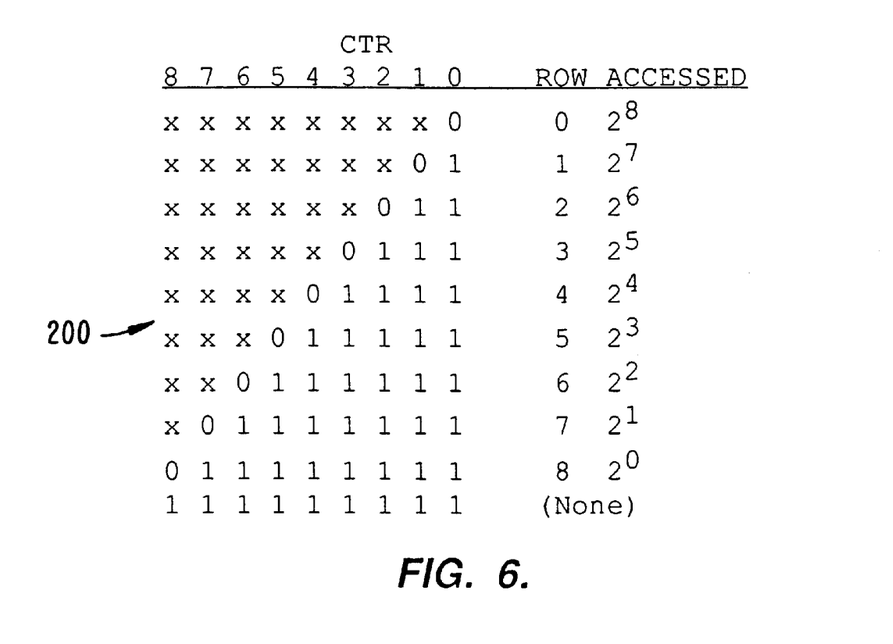
FIG. 6 is a table depicting a counter mapping function.

As the count increments the rows are accessed in the following order:

| CTR | 0 | 1 | 2 | 3 | 4 | 5 | 6 | 7 | 8 | 9 | 10 | 11 |
|---|---|---|---|---|---|---|---|---|---|---|---|---|
| ROW | 0 | 1 | 0 | 2 | 0 | 1 | 0 | 3 | 0 | 1 | 0 | 2 |

The mapped counter input interleaves frequent access wins by row 0 (ports with bias values of 256 or more) with access wins by other rows. From the above, a person of skill in the art will recognize that each row is accessed half as often as the row above. This is indicated by the powers of 2 in FIG. 5.

The transposed table 200 is a static representation of the bias values of the port inputs. During an arbitration only certain ones of the port inputs will request access to the output ports. In the SAN described above, the output port selection logic 66 (FIG. 3) generates a request signal for a requesting input. The request signals from all the input ports form a Req Vector having "1" indicating those port inputs requesting access and "0"s for those port inputs not requesting access. The columns 120 in the transpose table are set to all "0"s for those ports not requesting access. The result is a Req Matrix 300 depicted in FIG. 7.

Figure 7:
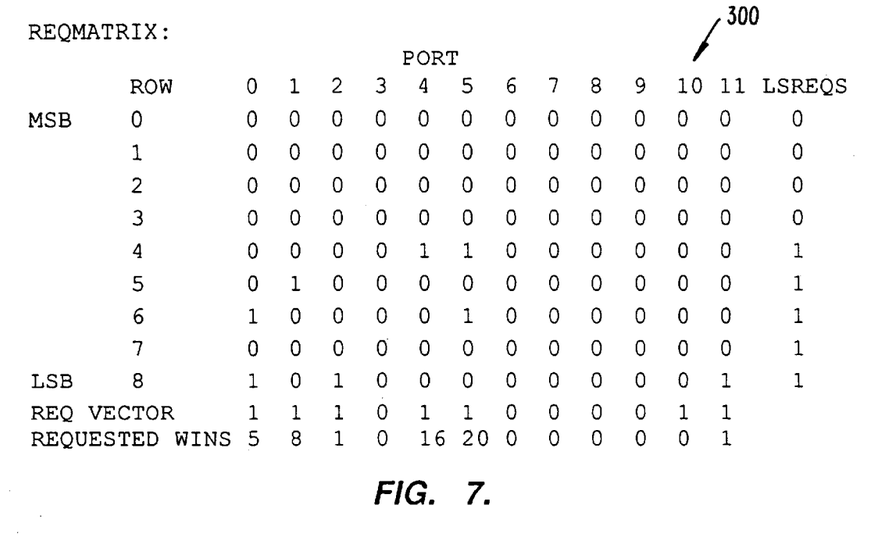
FIG. 7 is a table depicting a request matrix.

In the example of FIG. 7 the bias values are set to the decimal values of 5, 8, 1, 0, 16, 20, 0, 0, 0, 0, 0, 1. The Req Vector indicates that port inputs 3, 6, 7, 8, and 9 are not requesting access to the output port during this access cycle.

Note that in the Req Matrix 300 of FIG. 7, the first four rows contain all zeros. Accordingly, accessing these rows does not result in any port inputs winning access to the output ports. In a preferred embodiment, the count values selecting these rows are masked so that the rows are not output to the access granting system.

The LSReq bits are depicted at the right of the Req Matrix 300 of FIG. 7. Each LSReq bit is the logical sum (OR) of all the bits in a corresponding row and the LSReq bit of the row above. The LSReq bits are utilized to form mask bits that mask the all "0" rows. The effect of the four mask bits is to cause the counter to increment by 16 between each row access so that the top four rows are not accessed.

When a row is accessed, the ports indicated by "1"s in the row are given access to the output port starting from the left side of the row.

FIG. 8 depicts the results of an arbitration based on the Req Matrix 300 of FIG. 7. The operation of the system during an arbitration cycle is best understood by considering the concrete results depicted in FIG. 8.

In FIG. 8, the columns represent the masked counter output value (CTR); the number of winners per row (# Winners); the row accessed (Winners); the number of the row accessed (Row #); and the cumulative number of accesses granted to each port up to and including the current counter value (Accumulated Wins). Note that, due to the masking of the four lowest bits, the counter increments by 16 during row accesses. Also, the unmasked row in the largest MSB position (row 4 is this case) is accessed every other cycle due to the counter mapping function.

Row 4, which is in this case is the most significant non-zero row, is accessed every other clock to assure that ports having binary request vector "1"s in this row will have their requests handled most frequently. However, accesses to other rows are interspersed according to their significance so that no port is frozen out of the arbitration.

Figure 9:
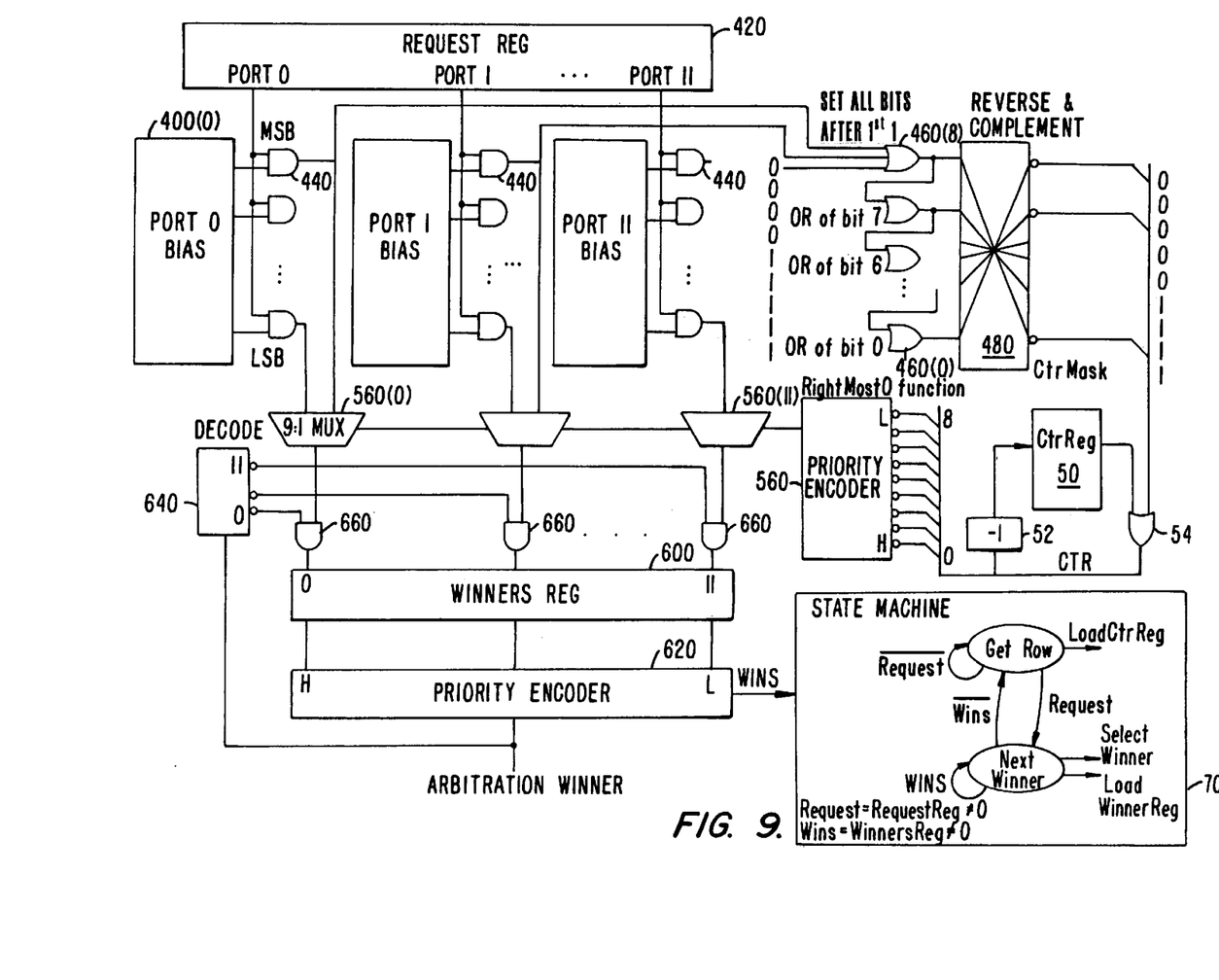
FIG. 9 is a schematic diagram of a hardware realization of a preferred embodiment of the invention.

FIG. 9 depicts a hardware realization of a preferred embodiment of the invention. This logic is included in the arbiter logic 86 (FIG. 3) of the SAN described above. However, in the example described below, biased arbitration logic for a router having 12 inputs is described.

In FIG. 9, each of the 12 columns of the transpose table are held in a bias value register 400(0) to 400(11). The Req Vector is held in a Request Reg 420. Each of the bits of the Req Vector is supplied by output port selection logic 66 (FIG. 3) of a port input. The Req Masking circuit is realized by AND gates 440 which output one value of a transpose table column ANDed with the corresponding bit value of the Req Vector. Thus, the outputs of the AND gates 440 for a port not requesting access are all "0"s.

All the bits from each row the Req Matrix are input to a corresponding OR gate 460(0) to 460(8) to output the LSreq bits. Note that the output of each OR gate 460 is coupled to the input of the OR gate for the next lowest row to assure that once an output of one is generated ones will be generated by all the lower OR gates 460. The LSreq bits are reversed and complemented by Reverse & Complement logic 480 to form the Ctr Mask vector.

The counter is implemented utilizing a CtrReg 500 and Incrementer 520. The counter value and Ctr Mask vector are supplied to masking OR gate 540 which outputs the masked counter value. The masked CtrReg output is incremented so that the most significant all zero rows are not accessed.

A mapping priority encoder 560 encodes the position of the rightmost zero in masked counter value. The encoded position controls MUXes 560(0) to 560(11) to select a row of the Req Matrix which is transferred to the Winners Reg 600.

The access granting priority encoder 620 generates a Arbitration Winner indicates the identity of the port input winning the arbitration. This Arbitration Winner signal is used to control the switch 34 (FIG. 4) to select the winning input port and also to generate the GRANT(n) signal to inform the winning port that its request has been granted. The access granting priority encoder also asserts a Wins signal each time an input wins an arbitration.

The output of the access granting priority encoder 620 is also received by decoder 640 which, in cooperation with AND gates 660, causes the port inputs indicated by successive ones in the row held in the Winner's register 600 to gain access to the output port.

Figure 10:
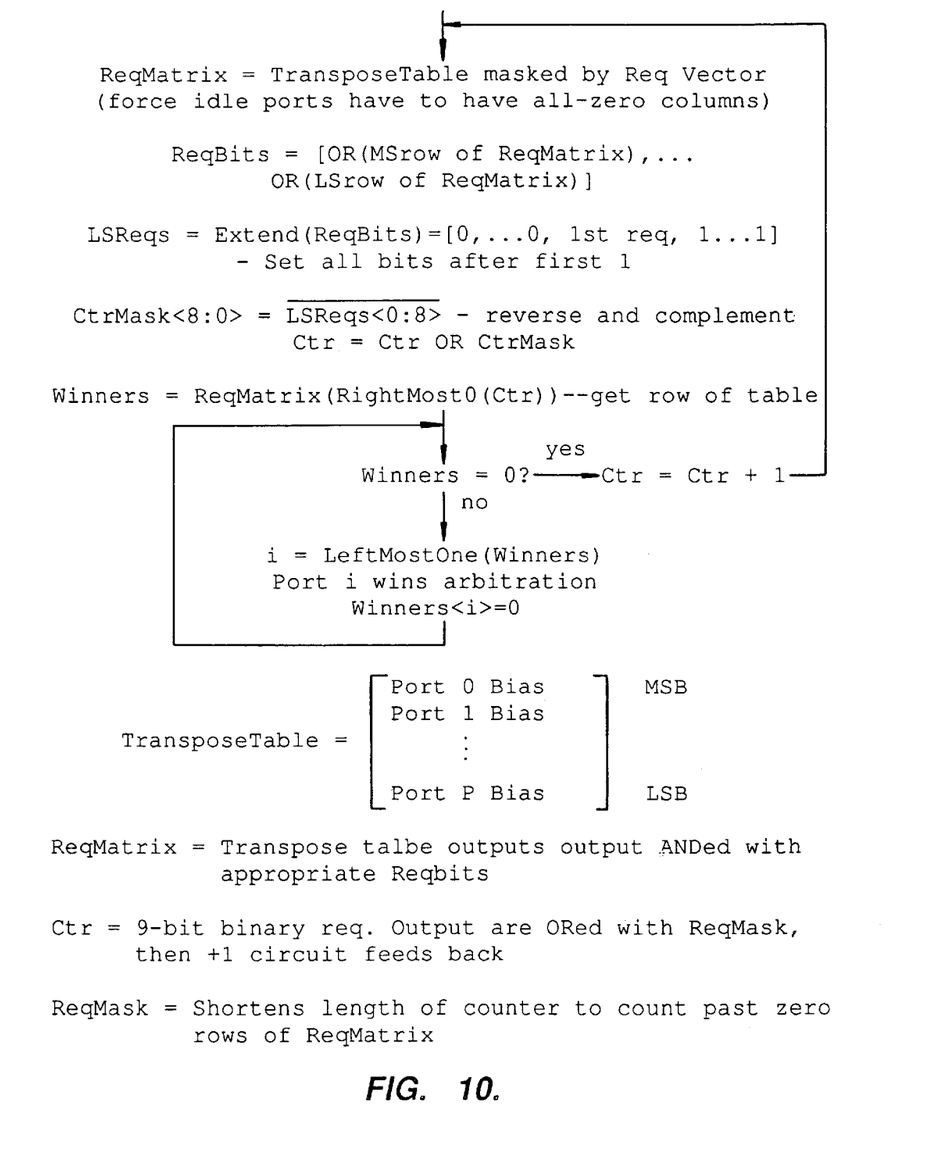
FIG. 10 is a flowchart illustrating the operation of the hardware realization of FIG. 9.

The operation of the system is further depicted by the state machine diagram 700 in FIG. 9 and the flow chart of FIG. 10. Note that as long as the Request signal is not zero, i.e., there is an input port requesting access, the system continues to increment the counter register output to access rows of the Req Matrix 300. Also, for a given row, access will be granted sequentially to all port inputs having "1" in the row until the Win signal is unasserted.

In view of the above, it is apparent that an efficient biased arbitration scheme is implemented by a very simple hardware arrangement. Additionally, from a programmer's point of view, only the bias vectors need to be loaded into the bias registers 40. There is no need to explicitly consider the structure of the transpose table. Also, as depicted in FIG. 8, the access to the output port is evenly spaced over the arbitration period to avoid starvation of certain nodes.

The transpose table arbitration bias technique has been described in the context of router arbitration. However the technique has utility in other systems such as bus arbitration and in Virtual Interface (VI) Architecture.

In the context of bus arbitration, in a PCI system the transpose table technique is utilized to allow the BIOS to give any level of priority to any device. If every slot is assigned a bias number to assign the priority level for the slot, then arbitration priorities are guaranteed to be assigned in ratios of assigned bias values.

Figure 11:
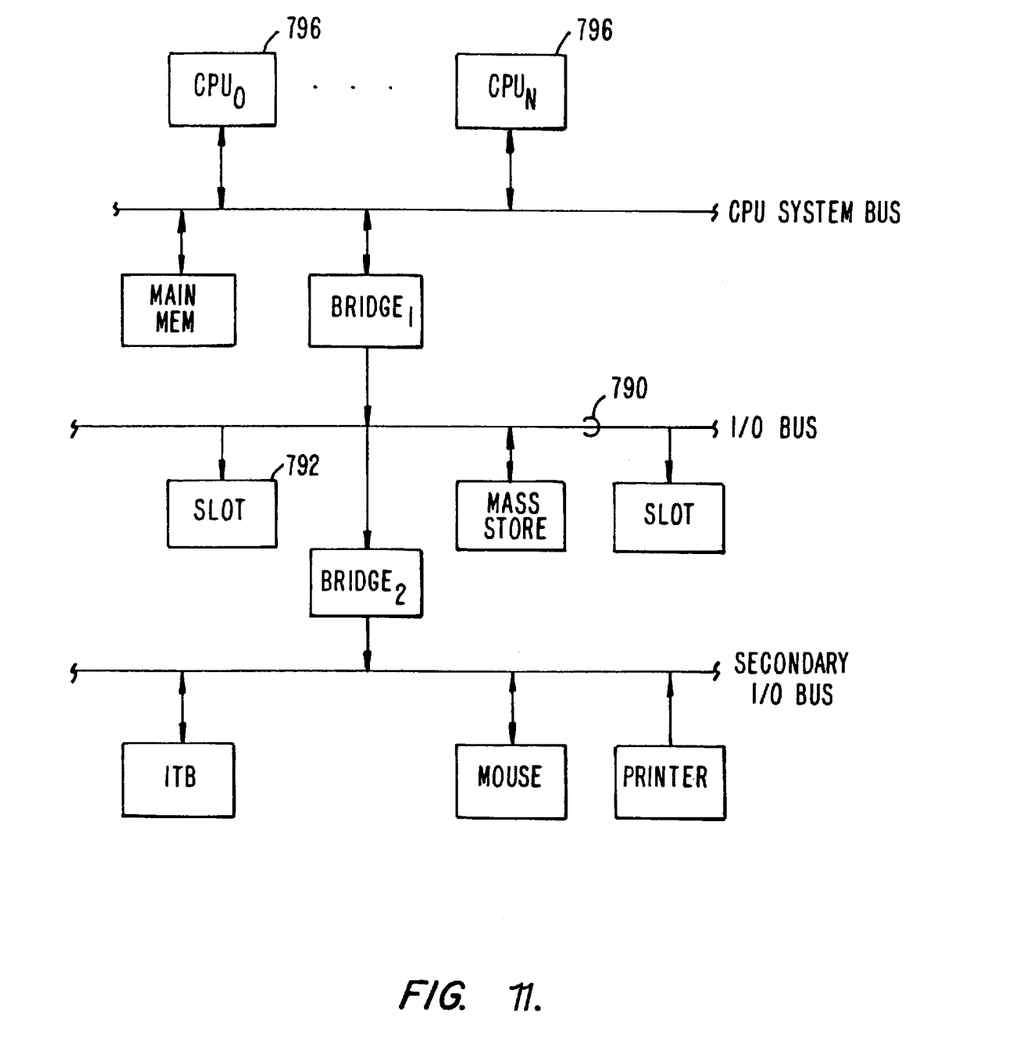
FIG. 11 is a schematic diagram of the bus structure of a processing system.

FIG. 11 depicts a computer system having an I/O bus 790 having a plurality of slots 792. The biased arbitration system is implemented in a bridge 794 where a different slots 792 could be requesting access to a particular shared resource such as a processor 796.

In the context of VI arbitration, each time a packet is sent the on-chip scheduler has to select one of the active VIs to service. In the transpose table approach, each row would logically have up to 16K bits (one per VI), and 4–8 rows to give 16–256 levels of service.

Figure 12:
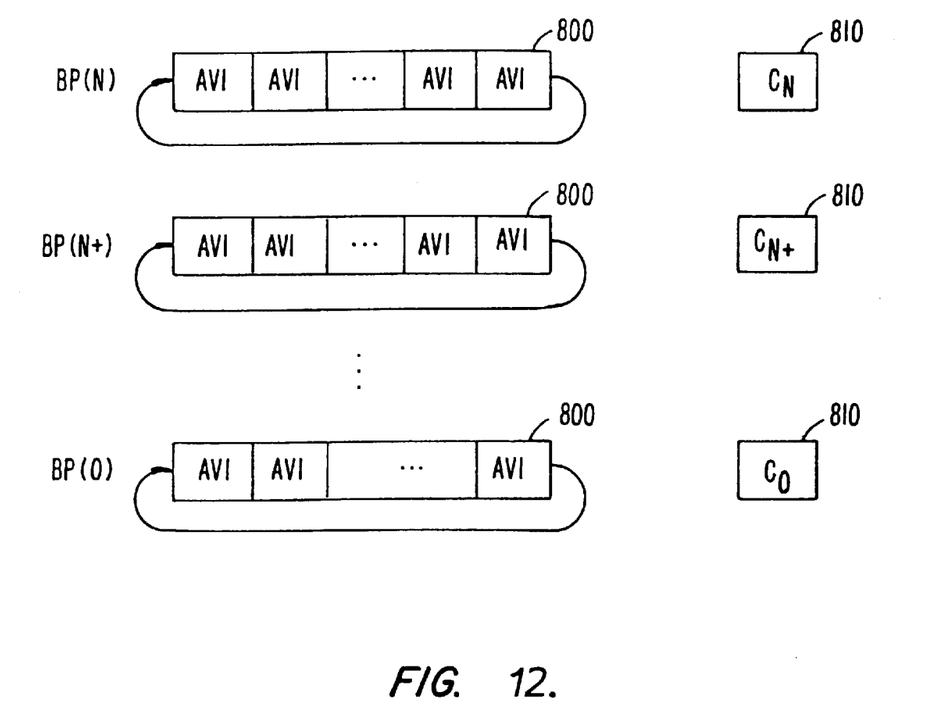
FIG. 12 is a schematic diagram of an alternative embodiment utilizing compression.

As is apparent from the above description, a large part of the table is utilized to store "0"s. For the VI arbitration technique the storage requirement can be reduced by compression. In one embodiment, a table is stored in local RAM as bit vectors or in a compressed form. One example of a compression technique is schematically illustrated in FIG. 12. A circular queue 800 of active VIs is utilized for each row (bit position in the binary bias vector). Each row of the table (bit position of binary bias value vector) also has a count value 810 of the number of active VIs with that bit on. To perform an arbitration, first a row with nonzero count is found, then all VIs in that row with bits on are serviced.

The invention has now been described with reference to the preferred embodiments. Alternatives and substitutions will now be apparent to persons of skill in the art. For example, although a twelve port router was described, the invention can be utilized in systems having fewer or more ports. Further, although the bias vectors are described having 9-bit precision, different precision levels can be utilized. Accordingly, it is not intended to limit the invention except as provided by the appended claims.

What is claimed is:

1. A method for biasing each of a plurality of requesters for participation in arbitration for data communication access to a shared resource, said method comprising the steps of:

provinding each of the plurality of requesters with a bias value, with each bias value having a value between 0 and $2^N$, with N being a predetermined integer;

forming a binary bias vector, having N binary digits, for each of said plurality of requesters, with said binary bias vector encoding said bias value provided for a corresponding requester, with each binary bias vector having a most significant bit position being a highest order bit position of the binary bias vector and with said binary bias vectors encoded so that a selected binary digit indicates a desired access to said shared resource;

forming a transposed table of binary bias vectors in the form of a matrix having columns numbered according to said plurality of requestors, with each column holding the binary bias vector for the corresponding column;

receiving a request vector identifying which of said requestors have requests pending during an arbitration cycle;

forcing all binary bias vectors for requesters not having requests pending to a value of zero;

incrementing a count value to select rows of said transposed table;

mapping said count value to preferably access rows holding most significant bits of said binary bias vectors; and sequentially granting access to said shared resource to requesters having said selected binary digit in an accessed row.

2. The method of claim 1 wherein said step of mapping comprises the steps of:

receiving said count value;

generating an indication encoding a location of a rightmost zero in said count value; and selecting a row corresponding to the location encoded by said indication.

3. The method of claim 2 further comprising the step of:

generating a mask vector having set mask bits for all rows having no selected binary digits starting with the row holding the most significant digit of said binary bias vector; and utilizing said mask vector to mask said count value to block access to rows corresponding to set mask bits so that rows encoding no requests for said access port are not selected.

4. A system for biasing each of a plurality of requesters for participation in arbitration for data communication access to a shared resource, said system comprising:

a plurality of bias registers, with each bias register corresponding to one of said requesters and each bias register holding a binary bias vector having N binary digits, with each binary digit held in a binary location of the binary register, with said binary bias vector encoding a bias value provided for a corresponding requester, with each binary bias vector having a most significant bit positions being a highest order bit position of the binary bias vector, and with said binary bias value vectors encoded so that a selected binary digit indicates a desired access to said shared resource;

a request register for receiving and holding a request vector identifying which of said requesters have requests pending during an arbitration cycle;

a request masking circuit, coupled to said request register and said plurality of bias registers, for masking binary bias vectors of requesters not having requests pending to have no digits equal to said selected binary digit;

a counter for periodically incrementing a count value;

a counter mapping circuit, coupled to receive said count value, for mapping said count value to preferably access rows of binary locations of said bias registers holding more significant bit positions of said binary bias vectors; and a request granting circuit for sequentially granting access to said shared resource to requestors having said selected binary digit in an accessed row.

5. The system of claim 4 further comprising a counter masking unit comprising:

a mask logic unit, coupled to said request masking circuit, for generating a mask vector having set mask bits for all rows having no selected binary digits starting with the row holding the most significant digit of said binary bias vector; and a masking circuit, coupled to receive said mask vector, for utilizing said mask vector to mask said count value to block access to rows corresponding to set mask bits so that rows encoding no requests for said access port are not selected.

6. A method for biasing each of a plurality of requesters for participation in arbitration for data communication access to shared resource, said method comprising the steps of:

providing each of the plurality of requestors with a bias value, with each bias value having a value between 0 and $2^N$, with N being a predetermined integer;

forming a binary bias vector having N binary digits for each of said plurality of requesters, with said binary bias vector encoding said bias value provided for a corresponding requester, with each binary bias vector having a plurality of bit positions with a most significant bit position being the highest order bit position of the binary bias vector and with said binary bias value vectors encoded so that a selected binary digit indicates a desired access to said shared resource;

receiving a request vector identifying which of said requester have active requests pending during an arbitration cycle;

providing a circular queue for each bit position of said binary bias vector;

storing locations of said selected binary digit for the bit position of each binary bias vector having an active request in a corresponding circular queue;

storing the number of locations stored in each circular queue;

incrementing a count value to select circular queues corresponding to bit positions of said binary bias vector;

mapping said count value to preferably access most significant bit positions of said binary bias vectors; and sequentially granting access to said shared resource to requestors having active request stored in an accessed circular queue.

7. A computer system comprising:

a shared resource;

a plurality of requester devices that request access to the shared resource;

a plurality of bias registers, with each bias register corresponding to one of said requesters and each bias register holding a binary bias vector having N binary digits, with each binary digit held in a binary location of the binary register, with said binary bias vector encoding a bias value provided for a corresponding requestor, with each binary bias vector having a most significant bit positions being a highest order bit position of the binary bias vector, and with said binary bias value vectors encoded so that a selected binary digit indicates a desired access to said shared resource;

a request register for receiving and holding a request vector identifying which of said requesters have requests pending during an arbitration cycle;

a request masking circuit, coupled to said request register and said plurality of bias registers, for masking binary bias vectors of requesters not having requests pending to have no digits equal to said selected binary digit;

a counter for periodically incrementing a count value;

a counter mapping circuit, coupled to receive said count value, for mapping said count value to preferably access rows of binary locations of said bias registers holding more significant bit positions of said binary bias vectors; and a request granting circuit for sequentially granting access to said shared resource to requesters having said selected binary digit in an accessed row.

8. A method for biasing each of a plurality of requestors for participation in arbitration for data communication access to a shared resource, said method comprising the steps of:

assigning a bias value to each of the plurality of requestors, with requesters requiring frequent access having higher bias values;

forming a plurality of storage areas for holding requestor identifiers, with each requester identifier identifying a unique one of the requestors in the plurality of requestors;

periodically accessing each storage area in said plurality, with storage areas assigned a higher bias value accessed more frequently than storage areas assigned a low bias value;

storing requestor identifiers of requesters assigned a high bias in storage areas being accessed at a higher frequency and storing requester identifiers of requestors assigned a low bias value in storage areas accessed at a lower frequency;

granting data communication access to requestors identified by stored requestor identifiers in an accessed storage area.

9. A method for biasing each of a plurality of requestors for participation in arbitration for data communication access to a shared resource, said method comprising the steps of:

assigning a bias value to each of the plurality of requesters, with requesters requiring frequent access having higher bias values;

forming a plurality of storage areas for holding requestor identifiers, with each requestor identifier identifying a unique one of the requesters in the plurality of requesters;

periodically accessing each storage area in said plurality, with storage areas assigned a higher bias value accessed more frequently than storage areas assigned a low bias value;

storing requestor identifiers of requesters assigned a high bias in a first set of storage areas being accessed at a higher frequency and storing requester identifiers of requestors assigned a low bias value in second set of storage areas accessed at a lower frequency;

granting data communication access to requesters identified by stored requester identifiers in an accessed storage area.

10. A computer system comprising:

a bus;

I/O devices coupled to said bus;

a plurality of shared resources coupled to said bus;

a plurality of requester devices, coupled to said bus, that request access to the shared resource;

a biased arbitration unit coupled to said bus comprising:

a plurality of bias storage areas, with each bias storage area corresponding to one of said requesters and each bias storage area holding a binary bias vector having N binary digits, with each binary digit held in a binary location of the binary storage area, with said binary bias vector encoding a bias value provided for a corresponding requester, with each binary bias vector having a most significant bit positions being a highest order bit position of the binary bias vector, and with said binary bias value vectors encoded so that a selected binary digit indicates a desired access to said shared resource;

a request storage area for receiving and holding a request vector identifying which of said requesters have requests pending during an arbitration cycle;

a request masking circuit, coupled to said request storage area and said plurality of bias storage areas, for masking binary bias vectors of requesters not having request spending to have no digits equal to said selected binary digit;

a counter for periodically incrementing a count value;

a counter mapping circuit, coupled to receive said count value, for mapping said count value to preferably access rows of binary locations of said bias storage areas holding more significant bit positions of said binary bias vectors; and a request granting circuit for sequentially granting access to said shared resource to requesters having said selected binary digit in an accessed row.

11. The system of claim 10 wherein one of said shared resources is CPU.

12. The system of claim 10 wherein one of said shared resources in a bus slot.

13. The system of claim 10 wherein one of said requester devices is a CPU.

14. The system of claim 10 wherein one of said requestor devices is a bus slot.

15. The system of claim 10 wherein said I/O device is a keyboard.

* * * * *

UNITED STATES PATENT AND TRADEMARK OFFICE
CERTIFICATE OF CORRECTION

PATENT NO. : 6,424,655 B1
DATED : July 23, 2002
INVENTOR(S) : Robert W. Horst

It is certified that error appears in the above-identified patent and that said Letters Patent is hereby corrected as shown below:

Drawings,
Fig. 10, Sheet 7 of 9, line 20, change "lalbe" to -- table -- as shown in substitute FIG. 10.

Column 5,
Line 5, change "the" to -- that --;
Line 7, delete "the (local) clock use to".

Column 12,
Line 38, change "request spending" to -- requests pending --;
Line 53, change "resources in a bus slot" to -- resources is a bus slot --.

Signed and Sealed this

Seventeenth Day of June, 2003

JAMES E. ROGAN
*Director of the United States Patent and Trademark Office*